(12) United States Patent
Bailey

(10) Patent No.: US 10,588,278 B2
(45) Date of Patent: Mar. 17, 2020

(54) ADAPTABLE HYDROPONIC IRRIGATION SYSTEM

(71) Applicant: Fred W. Bailey, Grantham, NH (US)

(72) Inventor: Fred W. Bailey, Grantham, NH (US)

( * ) Notice: Subject to any disclaimer, the term of this patent is extended or adjusted under 35 U.S.C. 154(b) by 354 days.

(21) Appl. No.: 15/662,468

(22) Filed: Jul. 28, 2017

(65) Prior Publication Data

US 2018/0035626 A1    Feb. 8, 2018

Related U.S. Application Data

(60) Provisional application No. 62/370,894, filed on Aug. 4, 2016.

(51) Int. Cl.
*A01G 31/06* (2006.01)
*A01G 31/02* (2006.01)
*A01G 27/00* (2006.01)

(52) U.S. Cl.
CPC ............ *A01G 31/06* (2013.01); *A01G 31/02* (2013.01); *A01G 27/001* (2013.01); *Y02P 60/216* (2015.11)

(58) Field of Classification Search
CPC .. A01G 31/06; A01G 2031/006; A01G 31/00; A01G 31/02; A01G 27/003; A01G 27/00; A01G 27/005; A01G 27/006; A01G 27/008; A01G 27/02; A01G 27/06; A01G 27/001; A01G 9/023; A01G 25/162; A01G 25/165; A01G 25/16; A01G 25/06; Y01P 60/216
USPC ...... 47/62 R, 62 E, 62 N, 79, 48.5, 63, 59 R
See application file for complete search history.

(56) References Cited

U.S. PATENT DOCUMENTS

| 4,033,072 A | 7/1977 | Kobayashi et al. | |
| 4,447,983 A * | 5/1984 | Shinada | A01G 27/005 47/48.5 |
| 5,860,247 A | 1/1999 | Newby | |
| 7,222,454 B1 * | 5/2007 | Chen | A01G 27/003 47/48.5 |
| 8,725,301 B2 * | 5/2014 | Carskadon | A01G 27/001 700/282 |
| 2006/0168882 A1 * | 8/2006 | Hashimoto | A01G 27/003 47/64 |
| 2009/0038221 A1 * | 2/2009 | Poore, Jr. | A01G 27/003 47/62 R |
| 2010/0199555 A1 * | 8/2010 | Pole | A01G 27/005 47/62 R |

(Continued)

*Primary Examiner* — Trinh T Nguyen
(74) *Attorney, Agent, or Firm* — Semprebon Patent Services; Jeffrey E. Semprebon

(57) ABSTRACT

A hydroponic irrigation system reduces the time spent actively circulating a nutrient solution through one or more growing beds to provide an ebb-and-flow irrigation cycle. Nutrient solution is pumped from a nutrient tank to each growing bed via a liquid transport unit, having a liquid tube connected to a pump located in the nutrient tank at one end, with the other end anchored in the growing medium in the growing bed. A controller coordinates the operation of the pumps, selectively operating each pump to supply nutrient solution until the growing bed is saturated to a specified depth, after which the pump returns the nutrient to the tank, either passively via gravity or by actively pumping, to drain the nutrient solution from the growing bed back into the nutrient tank. The pumps can be activated sequentially, with the sequence initiated at selected time intervals to suit the plants being grown.

14 Claims, 8 Drawing Sheets

(56) References Cited

U.S. PATENT DOCUMENTS

| | | | |
|---|---|---|---|
| 2014/0075841 A1* | 3/2014 | Degraff | A01G 27/005 47/62 A |
| 2014/0249685 A1 | 9/2014 | Carskadon et al. | |
| 2015/0027548 A1* | 1/2015 | Moriarty | A01G 31/02 137/1 |
| 2015/0264899 A1 | 9/2015 | Kasner et al. | |
| 2015/0289463 A1 | 10/2015 | Moriarty | |
| 2016/0007548 A1 | 1/2016 | Carskadon et al. | |
| 2016/0242369 A1* | 8/2016 | Caceres | A01G 27/005 |

* cited by examiner

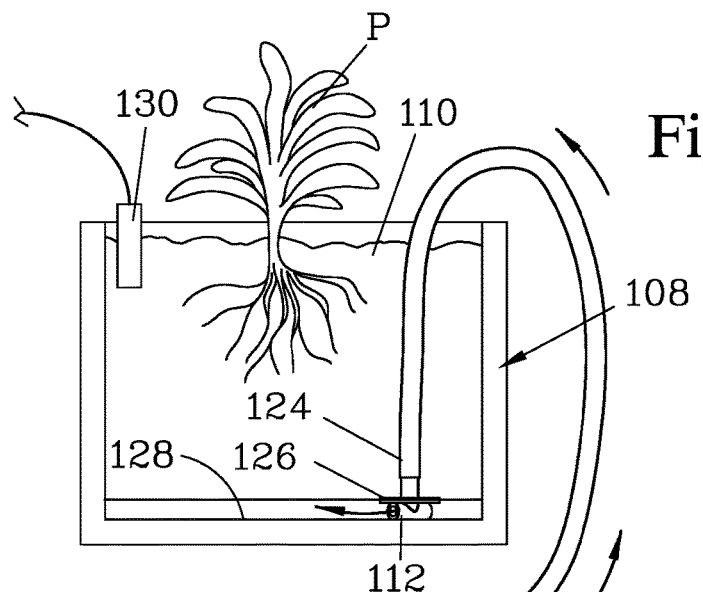
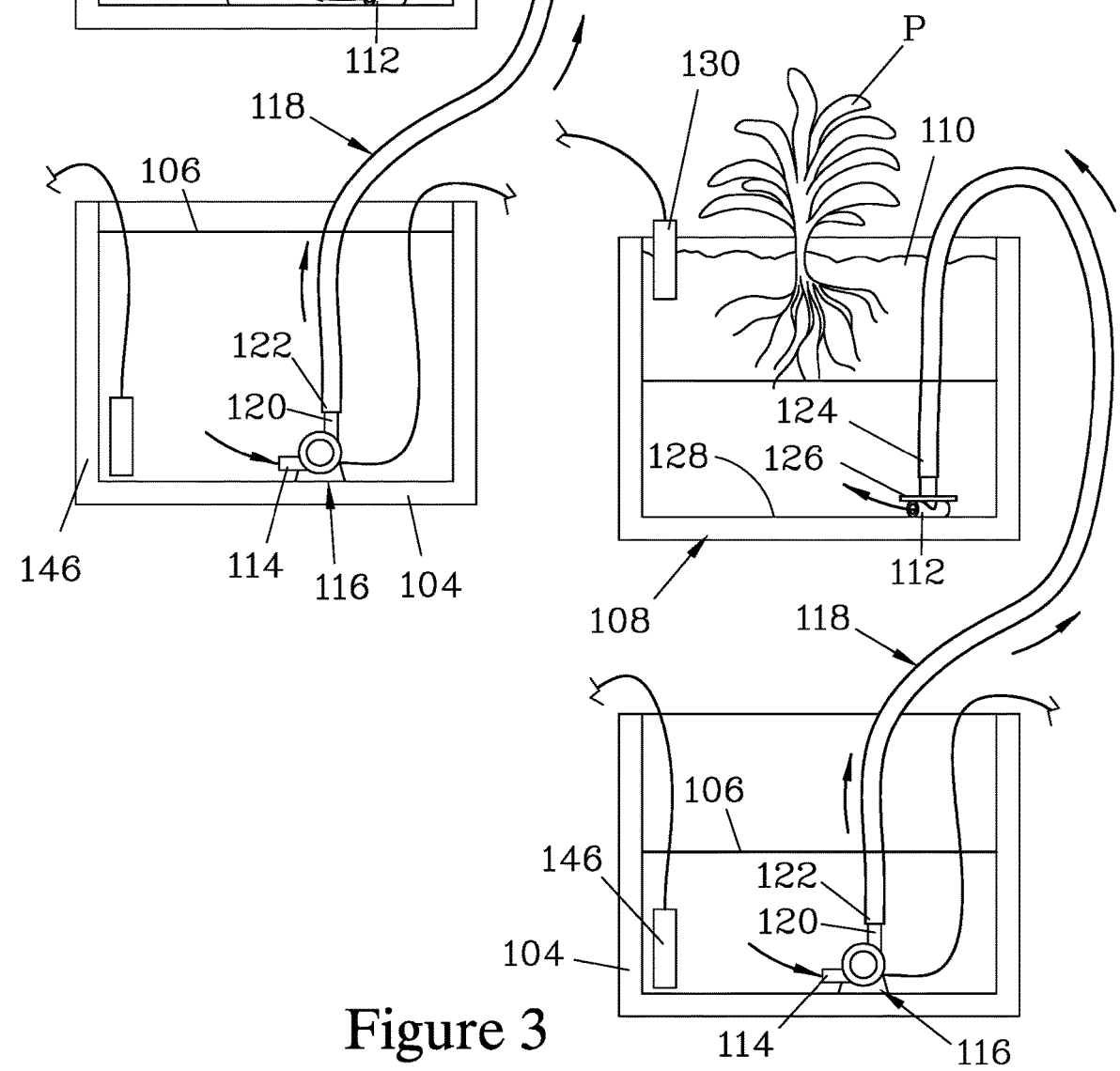

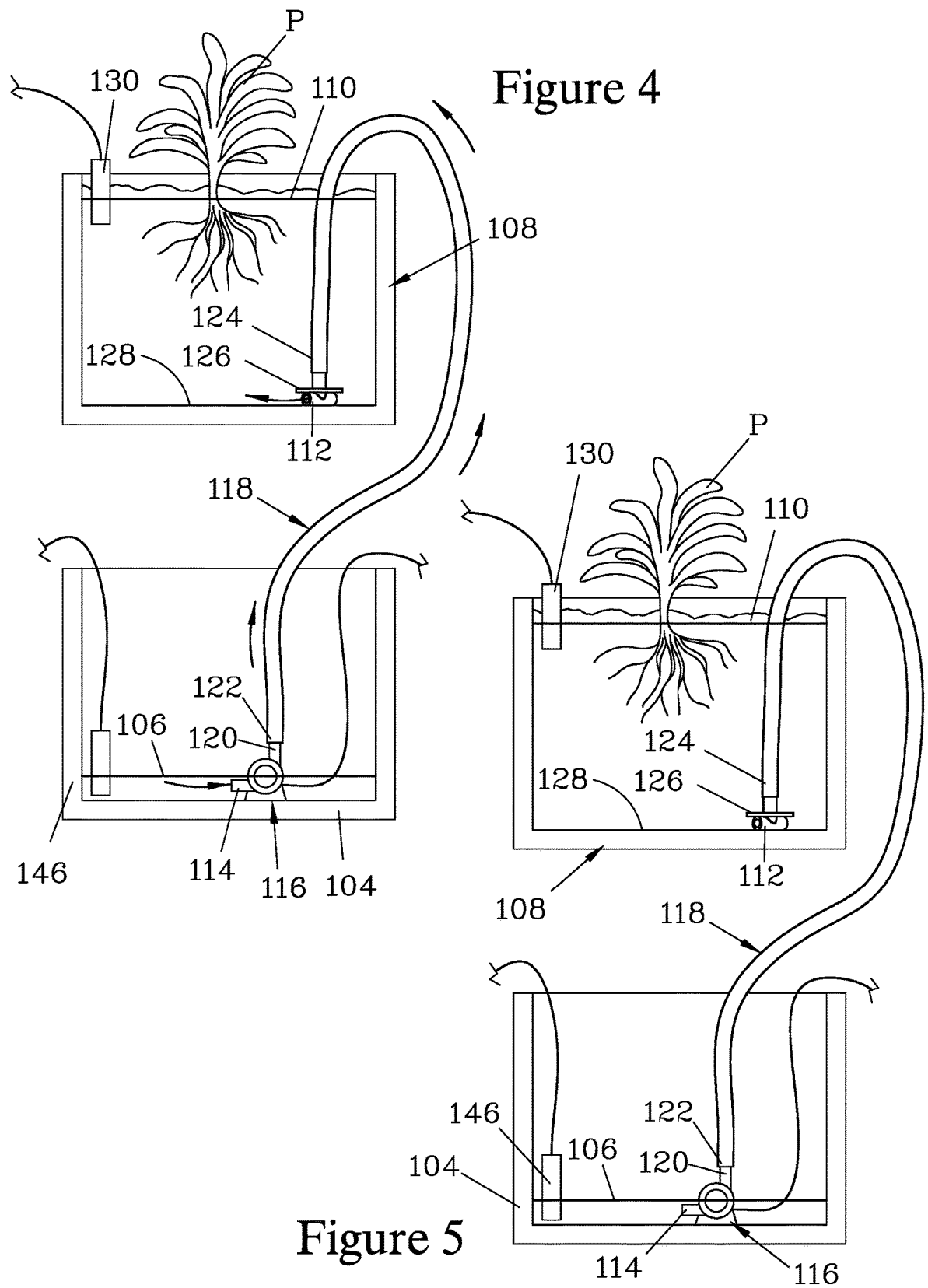

ADAPTABLE HYDROPONIC IRRIGATION SYSTEM

BACKGROUND

Hydroponic growing systems employ one or more growing beds in which plants are contained; the beds typically containing a growing medium for supporting the growth of plant roots. The growing bed is supplied with a nutrient solution that provides both the nutrients and water needed for the plants contained in the bed to grow. The nutrient solution must be supplied in such a manner that the roots of the plant are sufficiently aerated to prevent the plants from drowning.

Prior art irrigation systems suffer from either a requirement that pumps be operated continuously, thereby causing high energy consumption, or employ specialized growing beds equipped with automatic siphons to drain the growing bed once the nutrient solution reaches a specified height to provide an "ebb-and-flow" irrigation scheme. While the latter approach reduces energy consumption, it requires specialized vessels to serve as growing beds, increasing the cost and reducing the ability of the operator to select vessels suited to their particular needs or to employ existing vessels to reduce cost.

There is a need for a hydroponic irrigation system that avoids the deficiencies of the prior art, as well as a need for a system that is readily adaptable to allow the user to employ non-specialized vessels for the growing beds.

SUMMARY

The irrigation system of the present invention provides an ebb-and-flow irrigation cycle that is timed to reduce the period during which the nutrient solution is actively pumped, thereby reducing energy consumption. The irrigation system supplies nutrient solution to one or more fluid-tight growing beds containing a growing medium that supports the root structure of plants being grown in the bed; in the discussion below, the system is described in terms of supplying multiple growing beds. Since the system does not rely on particular details of the growing beds, it can use pre-existing fluid-tight vessels as growing beds, making the system adaptable to a wide range of situations.

A nutrient tank is provided to serve as a reservoir of the nutrient solution. The capacity of the nutrient tank should be greater than the capacity of the largest of the growing beds irrigated by the system; as a practical minimum, a nutrient tank capacity of 150% of the capacity of the largest growing bed is felt to be sufficient.

For each of the growing beds, the system has a liquid transport unit that acts to supply nutrient solution from the nutrient tank to the associated growing bed, and which facilitates return of nutrient solution from the growing bed back to the nutrient tank. Each liquid transport unit has a liquid tube terminating in a terminating at a tube first end, located in the nutrient tank, and a tube second end, located in the growing bed. A pump is located in the nutrient tank and connected to the tube first end, while a liquid port is attached to the tube second end and is anchored in the growing medium against a bottom of the growing bed.

The pump can be operated in either a supply mode or a return mode. In the supply mode, the pump is energized to pump nutrient solution through the tube in a supply direction, from the tube first end to the tube second end, thereby supplying nutrient solution from the nutrient tank to the growing bed. In the return mode, the pump allows return of nutrient solution in a return direction from the tube second end to the tube first end, thereby draining the growing bed and returning the nutrient solution to the nutrient tank.

The return mode of the pump can be either passive or active. When the nutrient tank is located below the level of all the growing beds, the liquid tube forms a siphon and the pump can be passive in the return mode, being unenergized and allowing the nutrient solution to flow through the pump in the return direction under the influence of gravity. This passive return mode allows a single-direction pump to be employed, and reduces energy consumption since the pump is only energized in its supply mode of operation. However, the requirement that the nutrient tank be located below the level of the growing beds makes this scheme unsuitable for situations where the nutrient tank cannot be readily placed at a lower level.

For situations where it is impractical to place the nutrient tank at a lower level than the growing beds, an active return mode is employed. The active return mode requires a bi-directional pump that can be selectively energized in the supply mode, in which the pump forces nutrient solution in the supply direction, or energized in the return mode, in which the pump force nutrient solution in the return direction. While allowing greater freedom in locating the nutrient tank relative to the growing beds, the active return mode requires the use of a bi-directional pump and increases energy consumption, both of which increase the cost of the irrigation system and its operation. In either active or passive return mode, the return of nutrient solution is through the same tube as used to supply the solution, thereby simplifying the structure of the system and avoiding the need for any dedicated structure in the growing bed, allowing existing fluid-tight vessels to be readily employed.

To operate the pumps supplying each of the growing beds, the irrigation system has a controller that coordinates the operation of the pumps. The controller selectively operates each of the pumps in its supply mode to supply nutrient solution from the nutrient tank through the liquid tube into the growing bed until the growing bed is saturated to a specified depth, and thereafter operates the pump in its return mode, either passively or actively, to drain the nutrient solution from the growing bed back into the nutrient tank. When multiple growing beds are provided, the controller typically operates the pumps sequentially, such that the nutrient solution is drained from a particular growing bed back into the nutrient tank before the next pump is activated in its supply mode to supply the nutrient solution from the tank to the next growing bed in the sequence.

The reduction of energy consumption results from only operating the pumps only when actively supplying the nutrient solution to the growing beds and, when an active return mode is employed, when returning the nutrient solution to the tank. The roots of the plants are submerged in the nutrient solution only for a brief time and are covered with growing medium with air access for the remaining time. In the supply mode, each of the pumps is only run as needed to fill the growing bed to a specified depth.

The controller can be set to operate the pump in its supply mode for a specified filling time that has been established, but more preferably is responsive to a high-level sensor placed in the growing bed. The high-level sensor provides a high-level signal to the controller when the nutrient solution in the growing bed reaches the specified depth, and upon receipt of the high-level signal, the controller switches operation of the pump from its supply mode to its return mode (either active or passive).

Typically, the controller includes a timer, and operates the pumps sequentially in their supply mode at specified time intervals determined with reference to the timer. The particular interval desired may be dependent on the type of plants grown in the beds, but should be significantly greater than the cycle time required to fill and drain all the growing beds in sequence.

When the system supplies multiple growing beds, the controller preferably sequences the operation of the pumps to assure that one pump has operated in its return mode sufficiently to drain its associated growing bed before the next pump in the sequence is activated to supply its associated growing bed. This allows all growing beds to be supplied from a common nutrient tank. The determination of when one growing bed has been sufficiently drained can be achieved by various schemes. One approach is to time the cycle required to fill and drain the largest growing bed and set a time delay D from the time one pump is activated in its supply mode to the time that the next pump is activated in its supply mode. For example, in passive-return systems, it has been found that time required to drain the growing bed is roughly one and half the time T required to fill the growing bed to the desired depth. Thus, the time for entire fill-and-drain cycle is 2.5*T, and the delay time D should be at least 2.5*T. Alternatively, the growing beds could be provided with low-level sensors that detect when the nutrient solution depth in the growing bed has reached a specified minimum depth, at which point a low-level signal is provided to the controller to indicate that the next pump in the sequence can be operated in its supply mode. Similarly, liquid level sensors could be placed in the nutrient tank and signals provided to the controller to indicate when the nutrient solution level in the tank is indicative of the most recently irrigated growing bed having been sufficiently drained. Even in systems supplying only a single growing bed, a tank low-level sensor in the nutrient tank is beneficial in preventing damage to the pump(s) by providing a signal to the controller to prevent operation of the pump(s) in the supply mode when the liquid level in the tank is below a specified minimum, which could be due to either nutrient being used to flood one of the growing beds or due to loss of liquid from the system caused by leakage or evaporation. Any of the sensors could provide a signal to the controller to trigger an audible and/or visual alarm to alert the user to the current condition of the system. Regardless of how the sufficient drainage of the growing beds is determined, after the sequential operation of all pumps has been completed, activation of the first pump in the sequence in its supply mode can then be delayed until the next interval determined by the timer in the controller, at which time the sequence is repeated.

BRIEF DESCRIPTION OF THE FIGURES

FIGS. 2-7 illustrate several stages of operation of the hydroponic irrigation system shown in FIG. 1 as the nutrient solution is first pumped from the nutrient tank into the growing bed (FIGS. 2-4), and then allowed to return by siphon action (FIGS. 5-7).

DETAILED DESCRIPTION

Figure 1:
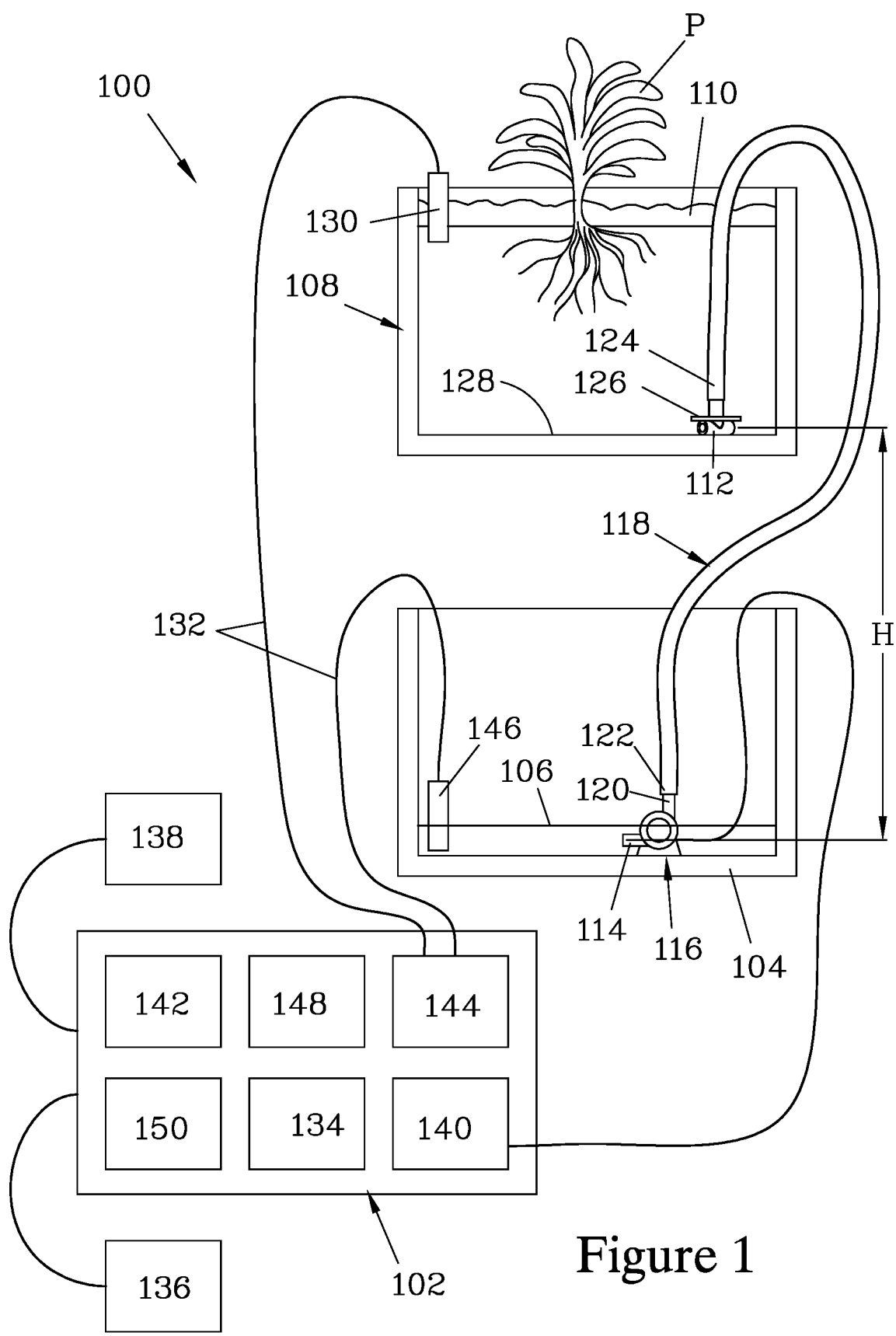
FIG. 1 illustrates a hydroponic irrigation system that forms one embodiment of the present invention. In this embodiment, a single growing bed is positioned above a nutrient tank, allowing passive return of nutrient solution to the tank by gravity siphon after the growing bed has been filled.

FIGS. 1-7 illustrate one example of a hydroponic irrigation system 100 of the present invention during several stages of operation. FIG. 1 illustrates the elements of the system 100, including a controller 102, while FIGS. 2-7 illustrate selected elements of the system 100 during various stages of an irrigation cycle.

The system 100 has a nutrient tank 104 that holds a reserve of nutrient solution 106 that includes water and a soluble nutrient. A growing bed 108 holds growing medium 110 and plants P being grown. The growing medium 110 can be a conventional medium used for hydroponic growing, such as gravel, natural or manufactures pebbles, vermiculite, etc., and should have a particle size of at least ⅛ inch (3 mm). The system 100 is a passive return system, and the growing bed 108 is positioned at a higher elevation than the nutrient tank 104, being elevated at a head distance H, which is defined as the vertical separation between a T-port 112 residing in the growing bed 108 and a pump inlet 114 of a pump 116 located in the nutrient tank 104. The head distance H must be selected relative to the length of a liquid tube 118 that connects the growing bed 108 to the nutrient tank 104 such that the weight of liquid in the portion of the tube 118 leading up from the growing bed 108 up to the highest point on the tube 118 is less than the weight of the liquid in the remaining portion of the tube 118, leading down to the tank 104, in order to provide the gravitational force to sustain a siphon when draining the growing bed 108. Additionally, the tube 118 must be sized relative to the surface tension of the nutrient solution 106 to prevent an air path from breaking the siphon; in prototype testing, food-grade ⅜ inch (9.5 mm) Tygon® tubing was found to be effective.

The pump 116 in the nutrient tank 104 is preferably a brush-less DC motorized centrifugal type pump. The pump 116 is operated by the controller 102, and has a pump outlet 120. The pump inlet 114 is open to the nutrient tank 104, and the pump outlet 120 is connected to the growing bed 108 by a liquid tube 118; preferably, food and beverage grade flexible polymer tubing is employed for the liquid tube 118.

The liquid tube 118 terminates at a tube first end 122, connected to the pump outlet 120, and a tube second end 124 that is located in the growing bed 108 and attached to the T-port 112 (one example of a suitable liquid port is discussed below and shown in FIG. 8) that is maintained in position in the growing medium 110 by a tube anchor 126, which engages the surrounding growing medium contained in the growing bed 108 to hold the T-port 112 against a bed bottom 128 of the growing bed 108.

Also positioned in the growing bed 108 is a high level sensor 130, which is positioned at a desired height in the growing bed 108 and is configured to generate a high level signal when the liquid level in the growing bed 108 reaches a specified maximum depth. The high level sensor 130 can be attached to the growing bed 108, or could include an anchoring element that maintains the position of the sensor 130 in the growing medium 110. One simple scheme is to attach the sensor 130 to the liquid tube 118 at a desired height above the T-port 112, which is anchored in the growing medium contained in the growing bed 108; the sensor 130 could be secured to the liquid tube 118 by cable ties or similar durable binding elements, wrapped sufficiently tightly as to hold the sensor 130 in place by frictional force. One preferred high level sensor 130 is discussed below and shown in FIG. 9. While the high level sensor 130 illustrated provides the high level signal to the controller 102 via a cable 132, it should be appreciated that, depending on the nature of the high level sensor 130, wireless communication could be employed.

The controller 102 is powered by a battery 134 that can be charged by an AC charging circuit 136, which is connected to an AC power outlet, or by a solar charging circuit 138. Various power control schemes could be employed; one scheme to minimize AC power consumption would be to use solar power preferentially, and only switch on a AC power adapter (either part of the AC charging circuit 136 or a separate AC adapter) as a backup. The pump 116 is connected to a power switching circuit 140 in the controller 102, which is operated under control of a microprocessor 142 to selectively supply electrical power to the pump 116. When the pump 116 is a DC-powered pump, it can be preferentially powered directly from the battery 134, from an AC power adapter, or from an output on the solar charging circuit 138; in the latter cases, the battery 134 can provide a backup power option. In a larger system that employs an AC pump for greater flow capacity, the pump can be run directly off AC power controlled by a relay in the power switching circuit 140; in this case a battery in combination with an inverter could be employed to provide backup power, or a generator could be provided and operated by the controller when the controller detects that AC power has been lost.

The controller 102 has a sensor interface circuit 144 that conditions the high level signal from the high level sensor 130 for presentation to the microprocessor 142, allowing the microprocessor 142 to determine when the liquid level in the growing bed 108 has reaches the specified maximum depth, as indicated by the high level signal. The system 100 also has a tank low level sensor 146 positioned in the nutrient tank 104 and configured to generate a low level signal when the depth of liquid in the nutrient tank 104 falls below a specified minimum depth. The tank low level sensor 146 is connected to the sensor interface circuit 144 by another cable 132, the sensor interface circuit 144 conditioning the low level signal for presentation to the microprocessor 142. The microprocessor 142 may provide an alarm in response to notify the operator of the situation, such as an audible alarm or a visual indication presented on a display 148. A warning signal could also be transmitted to a remote device that provides an alert to the operator.

The controller 102 of the system 100 includes a real time clock (RTC) 150 that communicates with the microprocessor 142 to allow the microprocessor 142 to determine when an irrigation cycle should be performed. To reduce power consumption, the microprocessor 142 could normally operate in a low current sleep mode (standby state) until the RTC 150 sends a timing signal to the microprocessor 142, in which case the RTC 150 includes the ability to store a programmed time and compare the current time to the programmed time to detect when it a signal should be sent to the microprocessor 142. Alternatively, some of these functions could be performed by the microprocessor 142 or other component of the controller 102. In any case, the controller 102 preferably has the ability to allow the operator to set the desired time for the irrigation cycles. The time to initiate an irrigation cycle could be set at specified intervals (such as every 3½ hours) or at set times of day with reference to the RTC 150; in the former case, the RTC 150 may not be needed, and a timing circuit that only monitors elapsed time might be employed. Suitable input and storage devices (not shown) for allowing an operator to enter and store information for use by processing components are well known in the art, and could include keyboards and/or an interface to communicate with a stand-alone computer, such as by WiFi, Bluetooth, or Ethernet communications, and/or by as USB or other standardized communication port. One simple scheme is to provide one or more switches that allow the operator to set a desired cycle time in set increments, such as half-hour increments, in combination with programming of the controller 102 to set the time (in either the RTC 150 or the microprocessor 142) in response to the setting of the switch(es). In a prototype system, and array of four binary switches has been effectively employed.

When the microprocessor 142 receives a time signal from the RTC 150 indicating that an irrigation cycle should be performed, the microprocessor 142 performs a check to see whether the low level signal has been received, indicating that the liquid level in the nutrient tank 104 is too low to safely operate the pump 116. If the no such signal has been received, the microprocessor then directs the power switching circuit 140 to energize the pump 116, causing it to draw liquid into the pump inlet 114 and force it out the pump outlet 120, actively pumping liquid from the tank 104 through the liquid tube 118 into the growing bed 108, initiating an irrigation cycle as shown in FIGS. 2-7. The microprocessor 142 may use a pulse width modulation (PWM) signal or other appropriate signal to the power switching circuit 140. If the low-level signal is received by the microprocessor 142 at any time during the filling process, the microprocessor 142 operates the power switching circuit 140 to cease energizing the pump 116. In addition to the low-level sensor 146 illustrated, the system 100 could be provided with additional level sensors in the nutrient tank 104. For example, a sensor might be positioned to respond to the condition where the current nutrient level is below that necessary to sufficiently fill the growing bed 108, thereby providing notice to the operator that additional nutrient solution 106 should be added prior to the next irrigation cycle, and optionally preventing operation of the pump 116 under the current condition. Another sensor might be positioned to warn of the case where the liquid level approaches the top of the nutrient tank 104, warning of an impending overflow if additional liquid is added.

FIGS. 2-4 illustrate the nutrient tank 104 and the growing bed 108 of the system 100 when the pump 116 is energized, as the nutrient solution 106 is pumped from the tank 104 to the growing bed 108, lowering the liquid depth in the tank 104 and raising the depth of liquid in the growing bed 108 until such time as the depth of the nutrient solution 106 reaches the specified maximum depth, as shown in FIG. 5. During the filling process, an indication of this active pumping state of the system could be provided on the display 148. When nutrient solution 106 reaches the specified maximum depth in the growing bed 108, the liquid level causes the high level sensor 130 to generate the high level signal, which is received by the microprocessor 142, causing the microprocessor 142 to operate the power switching circuit 140 to deactivate the pump 116. An indication of this state may also be presented on the display 148 or otherwise communicated to the operator.

Figure 6:
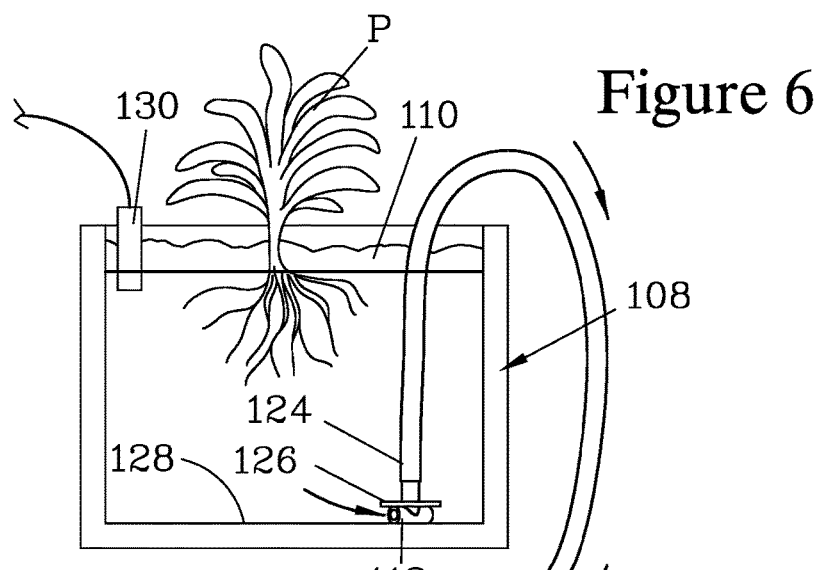
Figure 7:
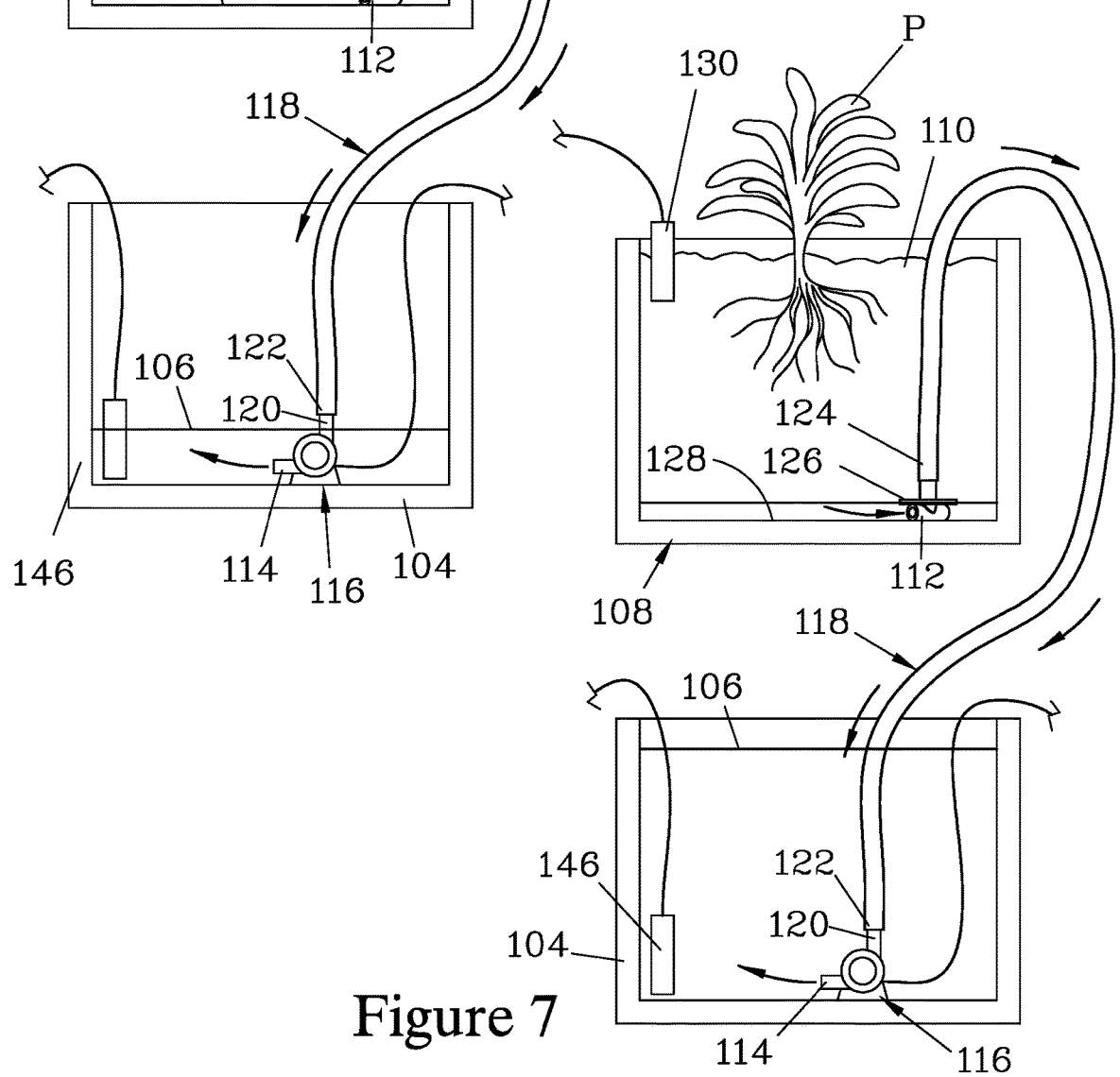

Deactivation of the pump 116 allows liquid to flow freely backwards through the pump 116, from the pump outlet 120 to the pump inlet 114. Because the tank 104 is located at a lower elevation than the growing bed 108, a siphon is created when the pump 116 is deactivated, and the nutrient solution 106 drains from the growing bed 108 through the liquid tube 118 back into the nutrient tank 104, as shown in FIGS. 6 and 7. The drainage continues until such time as the liquid level in the growing bed 108 is low enough to reach the liquid T-port 112, breaking the siphon. This completes the cycle and the hydroponic system 100 remains at the standby state until the next programmed time; as noted above, this could be set either as an interval (such as 3½ hours since the initiation of the previous cycle) or could be a specified time of day that is compared to the current reading of the RTC 150.

Figure 8:
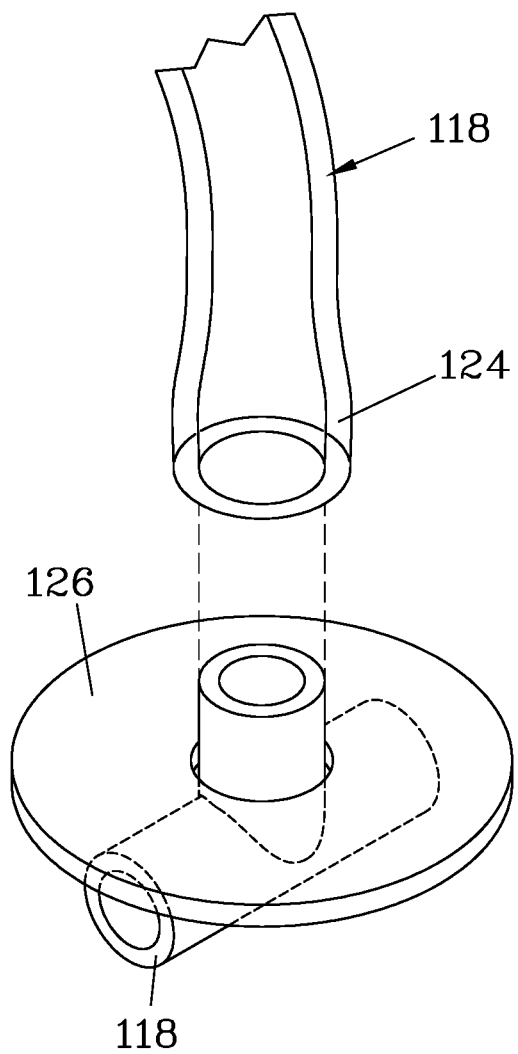
FIG. 8 illustrates one example of a port that can be attached to a liquid supply tube to maintain the end of the supply tube positioned at the bottom of a growing bed.

FIG. 8 is an illustration of the liquid T-port 112 and the tube anchor 126. The T-port 112 is a hollow T-shaped structure having the stem of the T connected to the tube second end 124, allowing the top of the T to rest against the bed bottom 128 of the growing bed 108 leaving opposed openings slightly above the level of the bed bottom 128 (shown in FIG. 1). The tube anchor 126 is formed as a round disk with a center hole through which the stem of the T of the T-port 112 can pass, and the tube anchor 126 is buried at the bottom of the growing medium 110 to hold the T-port 112 in position against the bed bottom 128. While shown as separate pieces, allowing existing parts to be readily employed, the T-port 112 and tube anchor 126 could be formed as a single part. Alternative configurations of liquid ports could be employed, and in all cases should be designed to provide one or more openings in close proximity to the bed bottom 128, with the openings sized large enough to avoid becoming clogged with debris.

Figure 9:
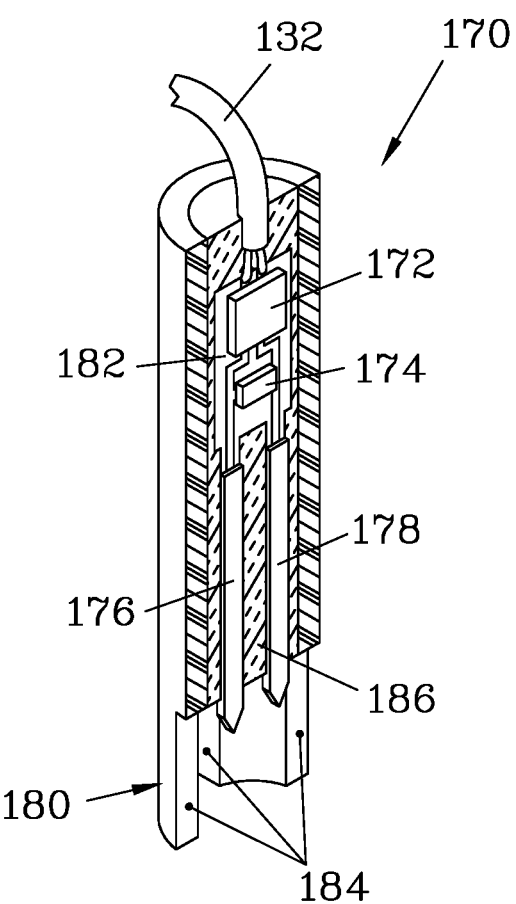
FIG. 9 illustrates one example of a liquid level sensor that monitors resistance to determine whether or not there is currently liquid between two probes. The sensor can be employed to detect a low level condition or a high level condition, and can be employed in a nutrient tank or in a growing bed.

FIG. 9 illustrate one example of a liquid level sensor 170 suitable for use as the high-level sensor 130 and the tank low-level sensor 146 in the system 100. Alternative sensors for monitoring the level of a liquid, including optical sensors, float switches, and other devices known in the art could be employed, and alternative sensing circuitry such as known in the art could be employed. The liquid level sensor 170 illustrated employs an RC timing circuit 172 that provides a signal with a frequency that is dependent on the resistance in the RC timing circuit 172. The resistance is provided by a fixed resistor 174 connected in parallel with two probes (176, 178) that can be fabricated by cutting copper clad printed circuit board to form the probes (176, 178) separated by a gap; alternatively, the probes could be provided by copper or other wire, which may be tinned with solder or otherwise provided with a surface treatment resistant to corrosion The length of the probes (176, 178) should be long enough to provide a repeatable liquid level trip point, a protruding length of ¼ inch (12 mm) has been found effective. For the high-level sensor 130, when the liquid depth becomes great enough to immerse the probes (176, 178) in the liquid, the resistant path between the probes (176, 178) through the liquid changes the resistance of the RC timer circuit 172, causing its frequency to change. The signal is provided to the microprocessor 142 through the sensor interface circuit 144, and the change in frequency is detected to provide the microprocessor 142 notice that a high-level condition exists, indicating that the liquid level in the growing bed 108 has reached the specified maximum depth. Similarly, for the tank low-level sensor 146, the probes (176, 178) are normally immersed, and the resistance provided by the combination of the fixed resistor 174 and the liquid between the probes (176, 178) sets the frequency of the RC timing circuit 172; if the liquid level drops far enough to fully expose the probes (176, 178), then the resistant path through the liquid is lost, and the resistance of the RC timing circuit 172 is set only by the fixed resistor 174, changing the frequency of the signal. Again, the microprocessor 142 receives the signal and detects the change in frequency, indicating a low-level condition. While shown provided at the location of the liquid level sensor 170, the RC timing circuit 172 could alternatively be incorporated into the sensor interface circuit 144 of the controller 102.

The probes (176, 178) are housed in a hollow sensor body 180 that is sufficiently large that the probes (176, 178) are spaced apart from a sidewall of the sensor body 180, to avoid the buildup of nutrient sediment that would alter the measurements from the sensor 170. There is a section 182 of the printed circuit board where the cable 132 is soldered to, which is coated with a water proofing that keeps the section 182 dry to prevent it from being saturated, which would change the resistance until this section 182 is dry again. The fixed resistor 174 is used to detect the connection of the sensor 170. The sensor body 180 can be formed as a cylinder of durable material such as PVC tube, and may have slots or holes provided in its sidewall to allow free flow of liquid into and out of the interior of the sensor body 180 during filling and draining; if the upper end of the sensor body 180 is capped, one or more air holes can be provided to avoid trapped air pressure inhibiting flow of liquid into the interior. In one embodiment that has been found effective and easy to fabricate, slots 184 are cut into the lower portion of the body 180 and the portion of the body 180 residing above the tops of the slots 184 is encapsulated with a waterproof material 186. In this case, the probes (176, 178) extend lower than the upper ends of the slots 184 to protrude from the waterproof material 186 and to allow the nutrient solution 106 to drain away without leaving residual liquid across the probes (176, 178). ⅛ inch (3 mm) slots have been found effective.

Alternative sensors known in the art for detecting the level of liquid in a vessel could be employed; the sensor should be selected to withstand high particulate (high turbidity) solution of nutrient and water. The water is usually in a liquid state but can sometimes reach the freezing point during winter storage. The pH of the nutrient solution can be corrosive. Each type of sensor needs an appropriate interfacing electrical circuit, which can be incorporated into the sensor itself or into the sensor interface circuit. Common sensors include those employing potential-free contacts, and those that employ an open collector or open drain electrical circuit, in addition to those that provide a frequency output that indicates the resistance or capacitance of the solution. These various sensor types include, but are not limited, to Single Point Float Switches, Multipoint Float Switches, Electro-optic Level Sensors, Capacitive Level Sensors, and Ultrasonic Level Sensors.

Figure 10:
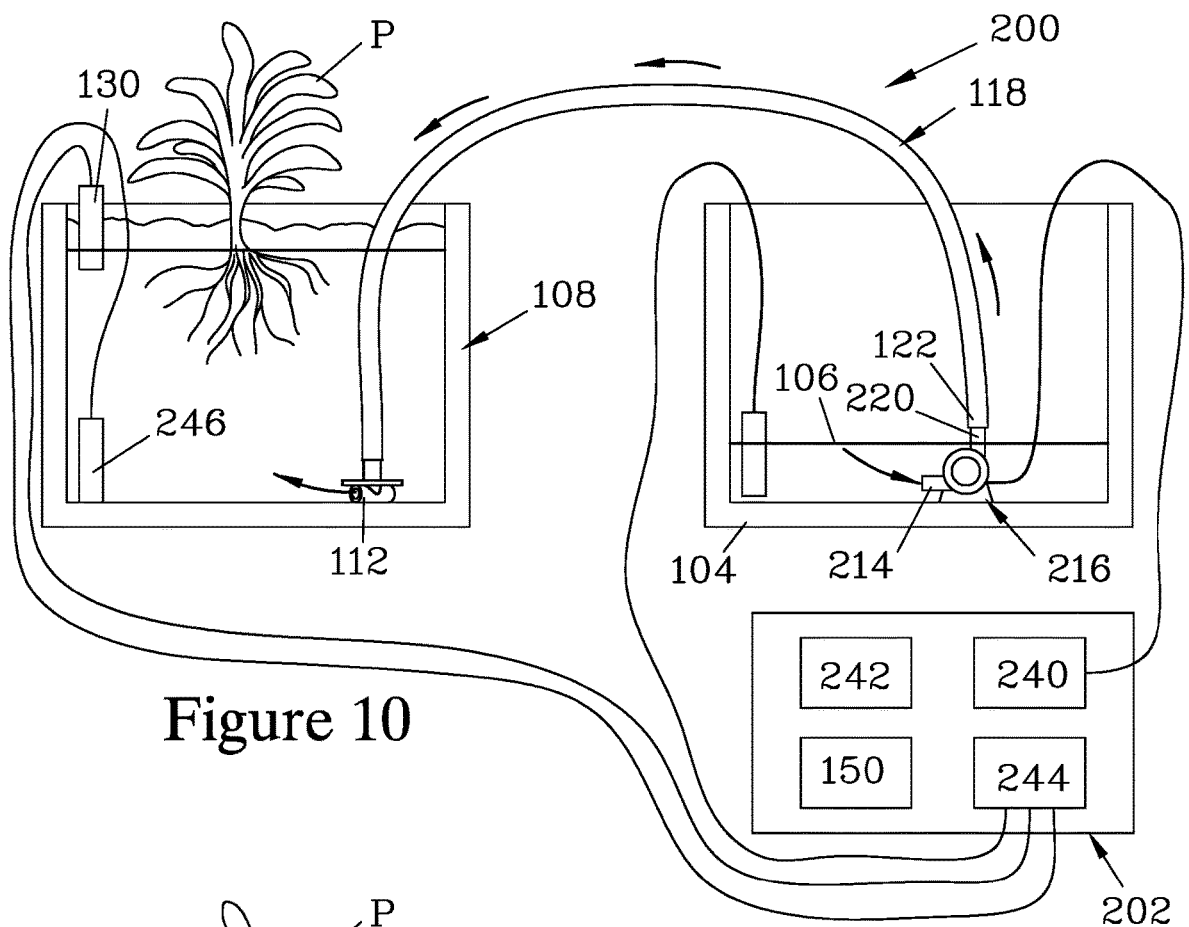
FIGS. 10 and 11 illustrate a hydroponic irrigation system that forms another embodiment of the present invention. In this embodiment, a single growing bed is positioned alongside a nutrient tank, and nutrient solution is actively returned from the growing bed to the nutrient tank by use of a two-way pump to actively pump the nutrient solution.
Figure 11:
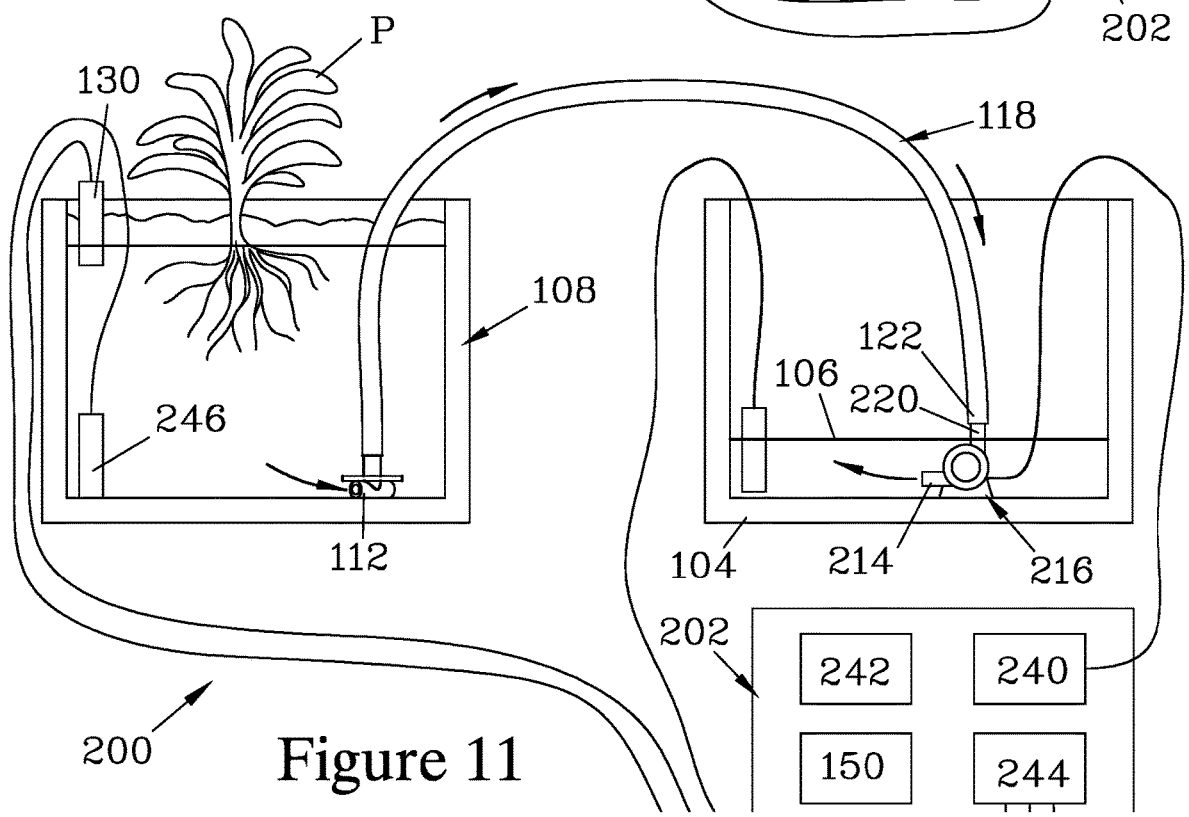

FIGS. 10 and 11 illustrate a hydroponic irrigation system 200 that employs many of the same elements as the system 100 discussed above, but which is designed for use in a location where it is impractical or undesirable to place the nutrient tank 104 at a lower elevation than the growing bed 108. Since the passive return of nutrient solution 106 by siphon action (as employed in the system 100) cannot be employed, the system 200 employs an active-return scheme that requires a 2-way pump 216 that can be energized in either a forward direction, where it draws liquid into a pump inlet 214 and ejects it from a pump outlet 220, or in a reverse direction where it draws liquid into the pump outlet 220 and ejects it from the pump inlet 214. Again, the tube first end 122 of the liquid tube 118 is connected to the pump outlet 220.

The filling stage of the irrigation cycle is similar to that of the system 100, with the pump 216 being energized in its forward direction at the appropriate time by a power switching circuit 240, responsive to a microprocessor 242 that receives an activation signal from the RTC 150. The pump 216 operates in the forward direction (as shown in FIG. 10) until high-level sensor 130 provides a signal to the microprocessor 242 indicating that the specified maximum depth of liquid in the growing bed 108 has been reached. At such time, the microprocessor 242 operates the power switching circuit 240 to operate the pump 216 in its reverse direction, which acts to draw liquid into the T-port 112 from the growing bed 108, and eject it from the pump inlet 214 into the nutrient tank 104 (as shown in FIG. 11). The growing bed 108 of the system 200 is provided with a bed low-level sensor 246, which can be formed similarly to the tank low-level sensor 146 in the nutrient tank 104. The bed low-level sensor 246 sends a signal to the microprocessor 242 via a sensor interface circuit 244 when a specified minimum depth of liquid in the growing bed 108 is detected, at which time the microprocessor 242 operates the power switching circuit 240 to cease energizing the pump 216. It should be appreciated that a high-level sensor properly positioned in the tank 104 could be employed to determine when the growing bed 108 has been sufficiently drained; however, directly monitoring the liquid level in the growing bed 108 is felt to more reliable. A controller 202 employed in the system 200 can also have additional components to perform the same function as corresponding components of the controller 102 discussed above.

Figure 12:
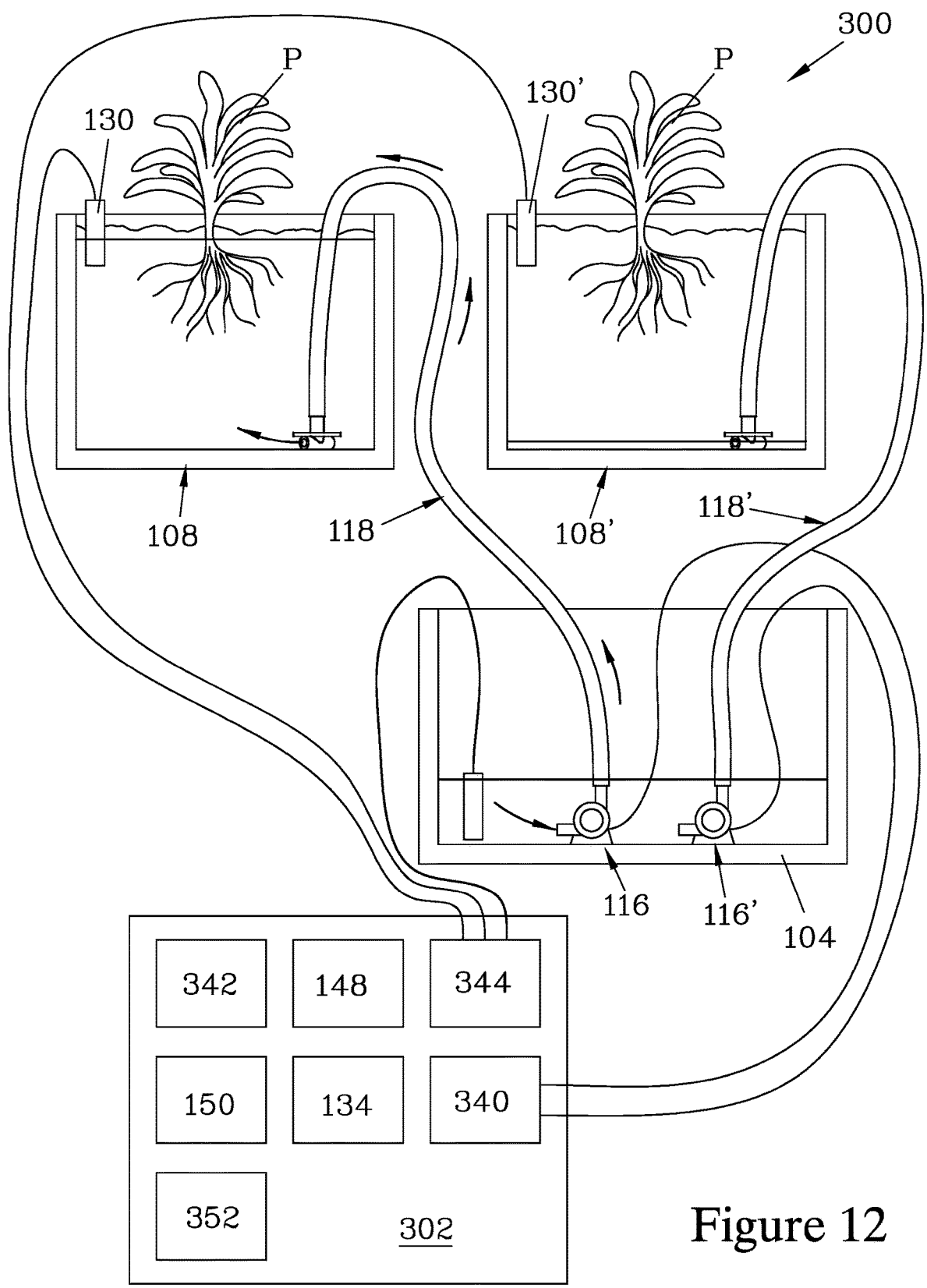
FIG. 12 illustrates a hydroponic irrigation system that forms another embodiment of the present invention, which has multiple growing beds. Each of the growing beds sequentially receives nutrient solution pumped from a common nutrient tank. Each growing bed is supplied by its own liquid transfer unit, having a pump which is activated in a coordinated manner to sequentially fill and drain the growing beds.

FIG. 12 illustrates a system 300 that serves to irrigate multiple growing beds 108 while employing a single nutrient tank 104; while two growing beds 108 are illustrated, the system 300 could employ additional growing beds 108 and associated pumps 116, liquid tubes 118, and additional components to make up fluid transfer unit for each growing bed 108. The system 300 has a microprocessor 342 that again responds to the RTC 150, and operates a power switching circuit 340. The power switching circuit 340 selectively energizes either the pump 116, which acts to fill the growing bed 108, or the pump 116', which acts to fill the growing bed 108'. Upon receipt of the appropriate time signal from the RTC 150, the microprocessor 342 operates the power switching circuit 340 to energize the pump 116, filing the growing bed 108 until such time as a high-level signal is received from high-level sensor 130, as well as recording the fact that the pump 116 has been activated. When the high-level signal is received, the microprocessor 342 operates the power switching circuit 340 to cease energizing the pump 116, allowing the liquid to drain from the growing bed 108 under siphon action back into the tank 104. The microprocessor 342 also sets a timer 352 that monitors elapsed time since the pump 116 has been shut off. After a specified time interval has elapsed as measured by the timer 352, the microprocessor 342 operates the power switching circuit 340 to energize the next pump that has not been recorded as being activated, in this case pump 116' (if additional pumps are employed, a designated sequence is established and the pumps are operated in sequence and being flagged as activated to advance the process to the next pump upon the end of the next elapsed drain time). Pump 116' is then activated until a high-level signal is received from a high-level sensor 130' positioned in the growing bed 108', at which time the microprocessor 342 operates the power switching circuit 340 to cease energizing the pump 116', and allowing the nutrient solution 106 to return to the tank 104 by siphon action. The microprocessor 342 can record that all pumps (116, 116') in the sequence have been activated, and then return to its standby mode until the next time signal is received from the RTC 150 to indicate when a new irrigation cycle should be performed. The elapsed time delay monitored by the timer 352 should be set to an interval of at least 1.5 T, where T is the time required to fill one of the growing beds (108, 108'). This delay helps assure that the first bed 108 has fully drained and returned sufficient nutrient solution 106 to the tank 104 to allow the bed 108' to be subsequently filled. An alternative timing scheme would be to set the delay time at 2.5 T, starting from the time that the pump 116 is energized. Adequate drainage could alternatively be detected by use of a high-level sensor in the tank 104, detecting when the liquid depth is sufficient to fill the growing bed 108' (or, where additional growing beds are provided, the next growing bed in the sequence). To allow for losses due to evaporation, leakage, etc., and provide a reserve, it is generally preferred for the tank 104 to have a capacity of at least 150% of the volume of the largest growing bed (108, 108').

Figure 13:
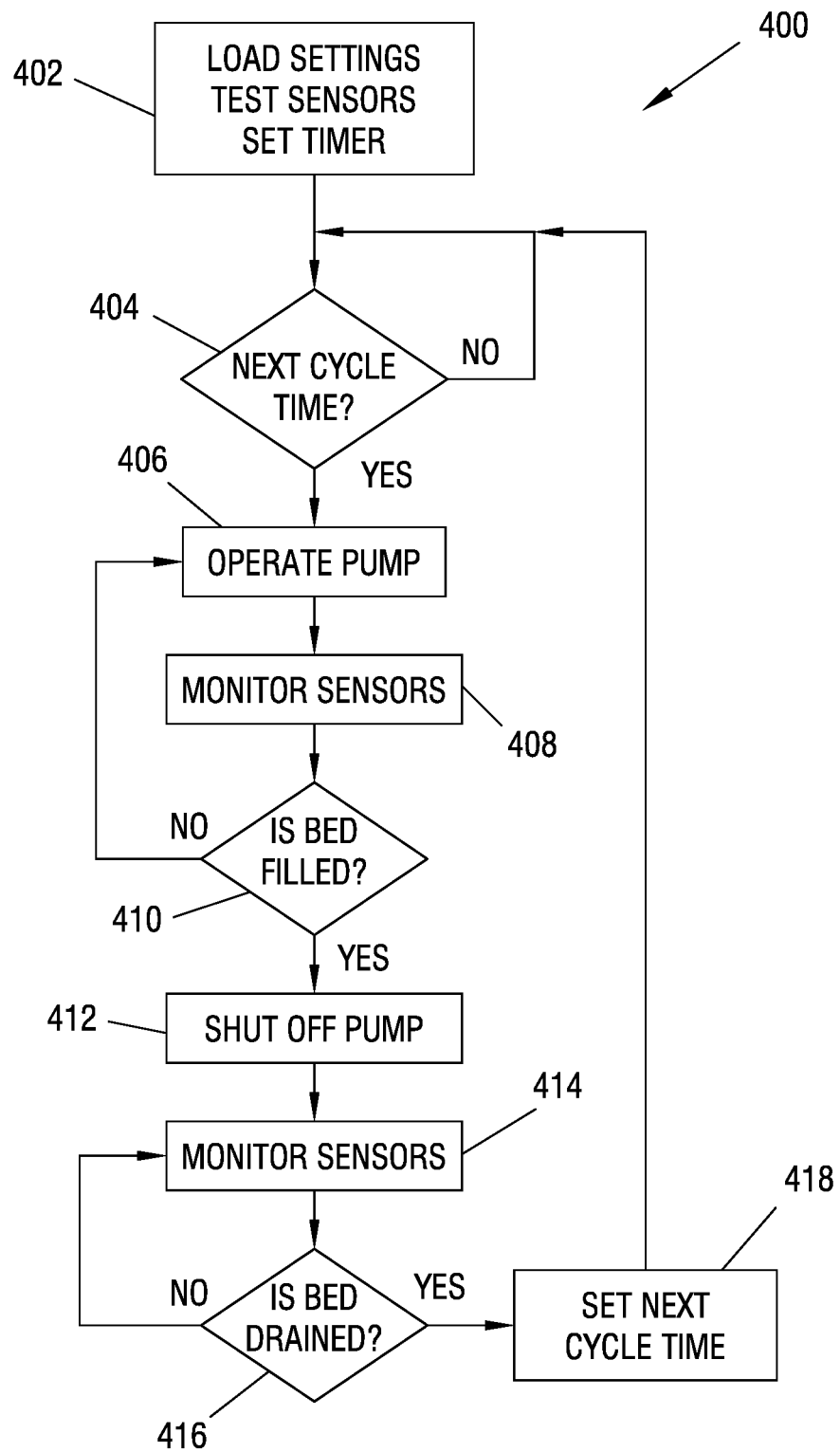
FIG. 13 is a flow chart illustrating one example of a control scheme for periodically filling a growing bed and allowing it to drain.

FIG. 13 is a flow chart illustrating one example of a control scheme 400 that can be employed for a passive-return system such as the system 100 shown in FIGS. 1-7, if additional sensors are added; one skilled in the art should appreciate that alternative control schemes to obtain similar functioning of the system 100 would be possible, and may be more appropriate to suit particular irrigation systems.

The controller 102 is first initialized in step 402 by loading settings that are accessible to the microprocessor 142; such settings could be loaded by a manual input device such as one or more switches, a keypad or interactive display screen running a suitable application, or could be loaded digitally though a communication port. A simple scheme is to provide a series binary switches to set a code for a desired time increment in 0.5 hour intervals, with each setting of the switches corresponding to a time interval stored in the controller 102. A set of four binary switches allow for up to 16 different time interval settings to be provided, however it may be preferred to limit the options, such as to provide a range of times from 0.5 hours to 6 hours. It should be appreciated that some settings may be stored in other components of the controller 102; for example, the desired time period for performing an irrigation cycle may be stored in a memory associated with the RTC 150, and calibration information for the level sensors (130, 146) could be stored in a memory associated with the sensor interface circuit 144. The level sensors (130, 146) should be tested to assure that they are operating properly, and an alarm provided to the operator if they are not. When sensors such as shown in FIG.

9 are employed, the controller 102 can check to see whether the signal from the sensor indicates the expected resistance, depending on whether the sensor is initially immersed (tank low-level sensor 146) or is initially dry (high-level sensor 130).

The controller 102 continually checks in step 404 to see whether the time is appropriate to initiate an irrigation cycle, as determined by the RTC 150 (serving as a timer) or by a dedicated cycle timer. If it is not time to initiate a cycle, the timer continues to run until it is indicated to be an appropriate time; this determination could be based on comparison of current time to a specified time of day, or based on elapsed time since the previous cycle (or elapsed since initialization).

When it is determined to be an appropriate time to perform an irrigation cycle, the controller 102 activates the pump 116 via the power switching circuit 140 in step 406. At this time, the pump 116 operates as shown in FIGS. 2-4 to actively pump nutrient solution 106 from the tank 104 into the growing bed 108, lowering the liquid level in the tank 104 and raising the level in the growing bed 108. The sensors (130, 146) are monitored (step 408) while the pump 116 continues to operate, and evaluated until such time as the liquid level in the growing bed 108 reaches a depth that causes the high-level sensor 130 to generate its high-level signal (step 410), this condition being shown in FIG. 5. When the high-level signal is received, indicating that the growing bed 108 is full, the pump 116 is shut off (step 412). While not shown in FIG. 13, the pump 116 could also be shut off in response to a low-level signal from the tank low-level sensor 146, indicating that the liquid level in the nutrient tank 104 has fallen below a specified depth (in which case an alarm should be provided to notify the operator of such condition). In the case of an active-return system such as the system 200 shown in FIGS. 10 & 11, the pump 216 would be switched to operating in the reverse direction rather than being shut off when the bed 108 is indicated to be full.

When the pump 116 is shut off, the nutrient solution 106 flows from the growing bed 108 back to the nutrient tank 104 under siphon action, as shown in FIGS. 6 & 7. In the flow chart illustrated, depth sensors (not shown in FIGS. 1-7) are monitored to determine when the drainage has been completed (step 414). Such sensors could include a low-level sensor positioned in the growing bed 108 (similar to the bed low-level sensor 246 shown in FIGS. 10 & 11) and/or a high-level sensor positioned in the nutrient tank 104. Alternatively, sufficient drainage could be established based on elapsed time after shutting off the pump 116. When the sensors and/or elapsed time indicate that the bed 108 has sufficiently drained (step 416), the process can reset the timer (step 418) for determining when a subsequent irrigation cycle should be performed. If a system employs multiple growing beds, such as the system 300 shown in FIG. 12, the procedure should set a note that the first bed has been irrigated, and repeat the procedure for the next growing bed, continuing until all growing beds have been sequentially filled and then drained.

It should be appreciated that the system of the present invention reduces energy consumption by only operating the pump(s) at specified time intervals. Furthermore, the system is simple in structure, requiring only a single liquid tube to connect to each growing bed and serving for both supply of fluid and drainage. Since there are no special requirements for the growing beds, a variety of pre-existing fluid-tight vessels could be employed. Furthermore, the system is adaptable to varying numbers and sizes of growing beds, allowing additional growing beds to be readily added, or allowing larger growing beds to be employed by providing a larger nutrient tank and pumps while retaining the same control system. These advantages make the system well suited to adapting to the various needs of individual users, as well as allowing a user to readily expand the system as their needs grow.

EXAMPLE

A prototype was built with 4 beds and 4 sets of liquid transport units. The pumps were one-directional 3.8 l/min. 12V DC pumps, and the liquid tubes employed ⅜ inch (9.5 mm) food-grade Tygon® tubing. The growing beds and nutrient tank were the same size, measuring 34.6 cm×21.0 cm×12.4 cm; however, preliminary testing was done using beds of different volume sizes and shapes, and the system correctly filled and drained all four beds on a rotating cycle. The beds were placed on shelves above the nutrient tank, with the highest bed placed about 5 feet (1.5M) above the nutrient tank and the lowest bed was about 1 foot (0.3M) above the nutrient tank. The controller was made from Arduino components and software with additional circuits to provide the liquid level sensing capacity and LED indicators to provide the operator notice of the system status. MOSFET power switching circuits were provided for each pump, having a 60V 18 A capacity to allow future use of larger pumps. In this prototype, elapsed time was employed to determine when to perform a new irrigation cycle, but a later embodiment employed an RTC with a separate oscillator to obtain an accurate time base. It was found to take about 1.5 times the fill time to drain the beds. The system operated at a nominal 12V DC; the battery voltage was maintained at 13.8V by a combination of a solar panel and an AC adapter; a PV solar panel as small as 5 W is felt to be sufficient for this size system. A 5 A-H 12V battery was employed. The DC motor current was typical for the pump size, about 600 mA, while the current drawn by the controller while in standby was about 12 mA. The cycle time selected was 3.5 hours. Under these conditions, a test without AC power found that a 5 Watt PV panel kept the battery charged and allowed recharge after running at night on battery only. After 2 days of rain, it was found that the battery voltage had dropped as low as 11V, but it recovered back to 13.8V after a full day of sun. To test the reliability of the pumps, the solution in the nutrient tank was allowed to dry out completely so that the maximum amount of sediment would be left in the pumps. The sediment also contained sand and dirt from the unwashed growing medium. The pumps were washed with water and the outside was brushed off, and the pumps still worked as expected.

The present invention allows the hydroponic irrigation system to be scaled to the desired application. For example, if the application is a small hydroponic system for the home or apartment, then small growing bed containers can be used without modification. If the application is a small greenhouse for the hobby grower, then larger growing bed containers can be used. If the application is an industrial size greenhouse, then industrial size growing beds can be used. The separation of bed cycle times allows the cycles to be optimized for different growing requirements, and the number of growing beds can be changed by adding or removing liquid transport units and changing the programming of the controller. When the nutrient tank is located below the growing beds, the system is designed to occupy only the floor space required for the growing beds.

While the novel features of the present invention have been described in terms of particular embodiments and preferred applications, it should be appreciated by one skilled in the art that substitution of materials and modification of details can be made without departing from the spirit of the invention.

What is claimed is:

1. A hydroponic irrigation system for use providing a nutrient solution to at least one fluid-tight growing bed containing a growing medium, the irrigation system comprising:
   a nutrient tank for containing the nutrient solution;
   a liquid transport unit for each of the at least one growing beds, said liquid transport unit having,
      a liquid tube terminating at a tube first end and a tube second end,
      a pump located in said nutrient tank and attached to said tube first end, said pump acting to supply nutrient solution through said tube in a supply direction from said tube first end to said tube second end when energized in a supply mode of operation, and allowing return of nutrient solution in a return direction from said tube second end to said tube first end when operating in a return mode,
         wherein said nutrient tank is located below the level of the at least one growing bed, and said pump is not energized when operating in the return mode, and is configured to allow flow of nutrient solution therethrough in the return direction when not energized, thereby allowing said liquid tube to act as a siphon to return the nutrient solution to said nutrient tank, and
      a liquid port attached to said tube second end, said liquid port being configured to be anchored in the growing medium against a bottom of the growing bed; and
   a controller for controlling operation of said pump so as to selectively operate said pump in the supply mode to supply nutrient solution from said nutrient tank through said liquid tube into the growing bed until the growing bed is saturated to a desired depth, and thereafter operating said pump in the return mode to drain the nutrient solution from the growing bed back into said nutrient tank.

2. The hydroponic irrigation system of claim 1 wherein said liquid transport unit further comprises:
   a high-level sensor positioned in the growing bed and configured to generate a high-level signal to said controller when the nutrient solution level in the growing bed reaches a predetermined height,
      said controller acting to switch operation of said pump from the supply mode to the return mode when the high-level signal is received.

3. The hydroponic irrigation system of claim 2 wherein said controller further comprises:
   a timer; and
   a control routine for activating said pump in the supply mode in response to said timer.

4. The hydroponic irrigation system of claim 3 wherein said high-level sensor further comprises:
   a pair of probes positioned so as to be at least partially immersed in the nutrient solution when the growing bed is filled to the specified height; and
   a timing circuit having at least one electrical component connected in parallel with said pair of probes, such that immersion of said pair of probes alters the period of said timing circuit.

5. The hydroponic irrigation system of claim 1 further comprising:
   a nutrient tank low-level sensor positioned in said nutrient tank and providing a low nutrient signal to said controller when the level of nutrient solution in said nutrient tank is at or below a specified minimum depth, said controller acting to prevent activation of said pump while the low nutrient signal is received.

6. The hydroponic irrigation system of claim 1 wherein the at least one growing bed includes a first growing bed with an associated first liquid transport unit and a second growing bed with an associated second liquid transport unit,
   further wherein said controller operates to sequence energization of said pumps of said first and second liquid transport units to allow nutrient solution to return to said nutrient tank from said first growing bed before energizing said pump of said second liquid transport unit to pump the nutrient solution into said second growing bed.

7. A hydroponic irrigation system for use providing a nutrient solution to at least one fluid-tight growing bed containing a growing medium, the irrigation system comprising:
   a nutrient tank for containing the nutrient solution;
   a liquid transport unit for each of the at least one growing beds, said liquid transport unit having,
      a liquid tube terminating at a tube first end and a tube second end,
      a pump located in said nutrient tank and attached to said tube first end, said pump acting to supply nutrient solution through said tube in a supply direction from said tube first end to said tube second end when energized in a supply mode of operation, and allowing return of nutrient solution in a return direction from said tube second end to said tube first end when operating in a return mode,
         wherein said pump is a bi-directional pump that can be selectively energized in either the supply mode of operation or in the return mode of operation, and wherein said pump acts to pump nutrient solution in the return direction when energized in the return mode,
      a high-level sensor positioned in the growing bed and configured to generate a high-level signal to said controller when the nutrient solution level in the growing bed reaches a predetermined height, and
      a liquid port attached to said tube second end, said liquid port being configured to be anchored in the growing medium against a bottom of the growing bed; and
   a controller for controlling operation of said pump so as to selectively operate said pump in the supply mode to supply nutrient solution from said nutrient tank through said liquid tube into the growing bed until the growing bed is saturated to a desired depth, and thereafter operating said pump in the return mode to drain the nutrient solution from the growing bed back into said nutrient tank,
      said controller acting to switch operation of said pump from the supply mode to the return mode when the high-level signal is received.

8. The hydroponic irrigation system of claim 7 wherein said controller further comprises:
   a timer; and
   a control routine for activating said pump in the supply mode in response to said timer.

9. The hydroponic irrigation system of claim 8 wherein said high-level sensor further comprises:
a pair of probes positioned so as to be at least partially immersed in the nutrient solution when the growing bed is filled to the specified height; and
a timing circuit having at least one electrical component connected in parallel with said pair of probes, such that immersion of said pair of probes alters the period of said timing circuit.

10. The hydroponic irrigation system of claim 7 further comprising:
a nutrient tank low-level sensor positioned in said nutrient tank and providing a low nutrient signal to said controller when the level of nutrient solution in said nutrient tank is at or below a specified minimum depth, said controller acting to prevent activation of said pump in the supply direction while the low nutrient signal is received.

11. A hydroponic irrigation system for use providing a nutrient solution to at least one fluid-tight growing bed containing a growing medium, the irrigation system comprising:
a nutrient tank for containing the nutrient solution;
a liquid transport unit for each of the at least one growing beds, said liquid transport unit having,
a liquid tube terminating at a tube first end and a tube second end,
a pump attached to said tube and acting to supply nutrient solution through said tube in a supply direction from said tube first end to said tube second end when energized in a supply mode of operation, and allowing return of nutrient solution in a return direction from said tube second end to said tube first end when operating in a return mode,
wherein said pump is a bi-directional pump that can be selectively energized in either the supply mode of operation or in the return mode of operation, and wherein said pump acts to pump nutrient solution in the return direction when energized in the return mode,
a high-level sensor positioned in the growing bed and configured to generate a high-level signal to said controller when the nutrient solution level in the growing bed reaches a predetermined height, and
a liquid port attached to said tube second end, said liquid port being configured to be anchored in the growing medium against a bottom of the growing bed; and
a controller for controlling operation of said pump so as to selectively operate said pump in the supply mode to supply nutrient solution from said nutrient tank through said liquid tube into the growing bed until the growing bed is saturated to a desired depth, and thereafter operating said pump in the return mode to drain the nutrient solution from the growing bed back into said nutrient tank,
said controller acting to switch operation of said pump from the supply mode to the return mode when the high-level signal is received.

12. The hydroponic irrigation system of claim 11 wherein said controller further comprises:
a timer; and
a control routine for activating said pump in the supply mode in response to said timer.

13. The hydroponic irrigation system of claim 12 wherein said high-level sensor further comprises:
a pair of probes positioned so as to be at least partially immersed in the nutrient solution when the growing bed is filled to the specified height; and
a timing circuit having at least one electrical component connected in parallel with said pair of probes, such that immersion of said pair of probes alters the period of said timing circuit.

14. The hydroponic irrigation system of claim 11 further comprising:
a nutrient tank low-level sensor positioned in said nutrient tank and providing a low nutrient signal to said controller when the level of nutrient solution in said nutrient tank is at or below a specified minimum depth, said controller acting to prevent activation of said pump in the supply direction while the low nutrient signal is received.

* * * * *